June 26, 1934.    H. E. HARRIS    1,964,118
BULK MATERIAL MEASURING AND DISPENSING DEVICE
Filed Feb. 16, 1934
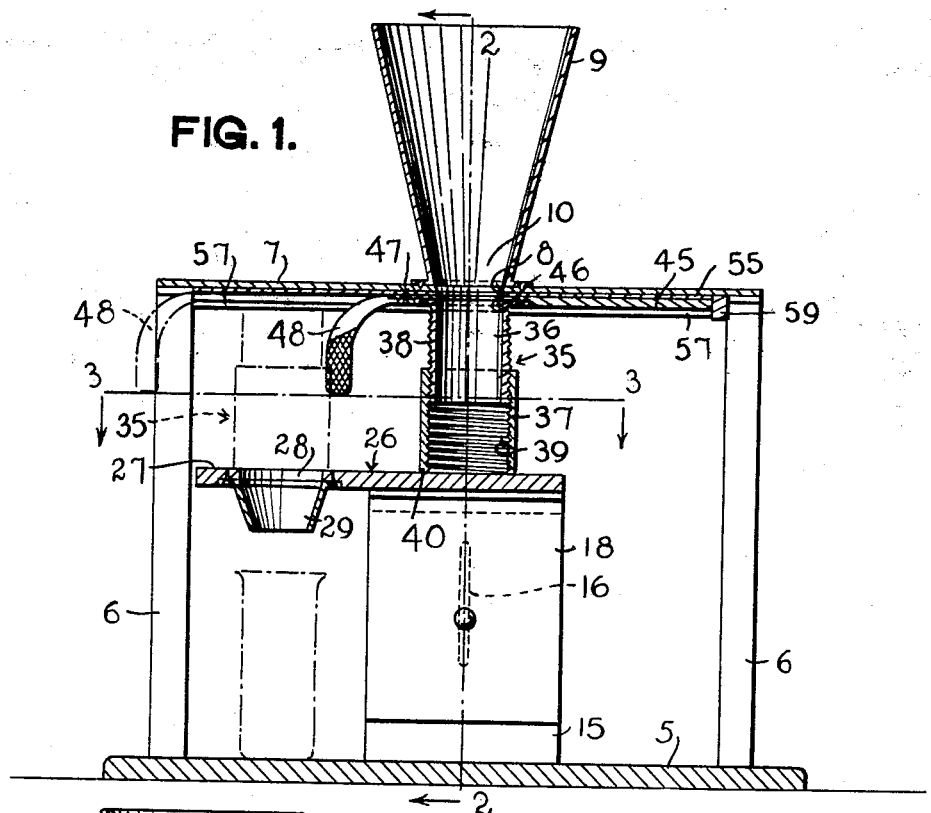
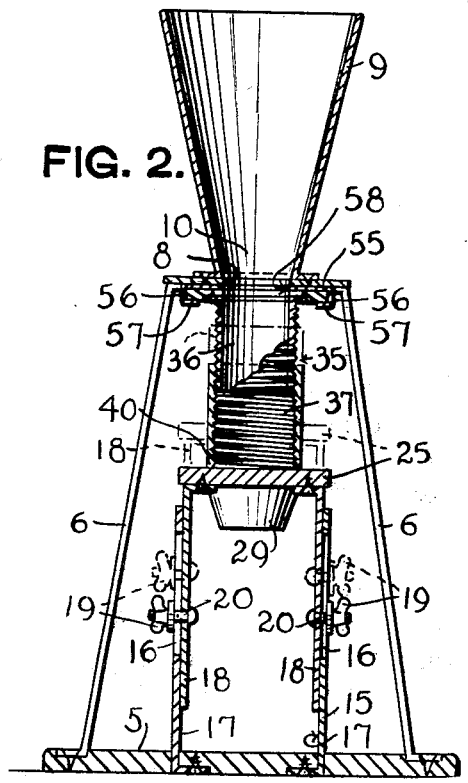
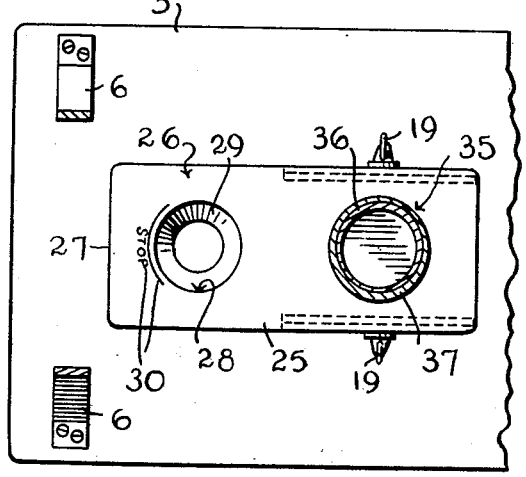
INVENTOR.
Henry E. Harris
BY Lancaster, Allwine and Rommel
ATTORNEYS.

Patented June 26, 1934

UNITED STATES PATENT OFFICE 1,964,118

BULK MATERIAL MEASURING AND DISPENSING DEVICE

Henry E. Harris, Little Rock, Ark.

Application February 16, 1934, Serial No. 711,604

4 Claims. (Cl. 221—105)

This invention relates to devices for measuring material in bulk and dispensing a predetermined quantity thereof.

The principal object of the invention is to provide a device which is readily adjustable to measure a determined quantity of material in bulk and which can rapidly deliver units of such quantity.

Another object is to provide such a device which includes no springs nor complicated mechanism apt to become clogged or to get out of order.

Still another object is to provide a measuring and dispensing device which will accurately measure material, the adjustment of the measuring means being such that slight differences in weight or volume of the material to be measured may be quickly provided for, such as the fraction of an ounce in difference.

Other objects and advantages of the invention will be apparent during the course of the following detailed description, taken in connection with the accompanying drawing, forming a part of this specification and in which drawing:—

Figure 1 is a longitudinal sectional view of the improved device.

Figures 2 and 3 are sections substantially on the respective lines of Figure 1.

In the drawing, wherein for the purpose of illustration is shown only a preferred embodiment of the invention, similar reference characters designate corresponding parts thruout the several views.

The improved device includes a suitable floor 5 from which may extend upwardly and inwardly a suitable number of support members 6 which preferably extend from adjacent the corners of the floor 5 and support a substantially flat table 7 having a preferably circular opening or port 8 therein. Extending upwardly from the top of the table 7 is a suitable hopper 9, preferably having downwardly sloping walls, and secured to the table 7 with its lower end 10 about the port 8.

Carried by the floor 5 is also a pair of spaced apart uprights 15 each of which may have a vertically extending slot 16. Sliding vertically along preferably the inner faces 17 of these uprights is a pair of legs 18 which may carry thumb nuts 19 with suitable screw threaded shanks 20 extending thru the slots 16 so that the nuts 19 may be threaded upon the shanks and bear against the outer faces of the uprights 15.

By this arrangement, means is provided for adjusting, into various horizontal planes and retaining in such planes, a combined slideway and base member 25 which preferably comprises an elongate, flat member attached to the legs 18, having a preferably smooth upper surface 26 and provided, preferably adjacent an end 27 opposite the end to which the legs are attached and on its longitudinal medial line, with a discharge port 28. Depending from the lower surface of the member 25 may be a truncated conical discharge spout 29. Upon the upper surface 26 may be disposed suitable indicia 30 such as the word Stop and the arc of a circle about a portion of and spaced from the discharge port 28.

Resting upon the upper surface 26 of the combined slideway and base member 25 is a measuring member 35, which preferably comprises a pair of cylindrical measuring vessels 36 and 37, movably interfitting one with the other by means of external screw threads 38 upon the vessel 36 and internal screw threads 39 which may be upon the vessel 37. These vessels 36 and 37 are open at both ends and the lower end 40 of the lowermost vessel 37 is adapted to contact with and slide over the smooth upper surface 26 of the member 25. It will be noted in Figures 1 and 2 that the inner circumference of the vessel 37 is less than the length or width of the member 25 and is about the same circumference as that of the port 28.

The upper end of the vessel 36, comprising a portion of the measuring member 35, is suitably attached to an elongate shutter or slide 45 which is provided with an opening or port 46 about which the member 36 extends in depending relation with the shutter. The forward end 47 of the shutter 45 has a suitable hand grip or handle 48.

Means is provided for permitting sliding of the shutter 45 in a definite path, and includes a guideway, preferably comprising a sheet of smooth metal 55 suitably secured to the under surface of the table 7 and extending beyond the vertical plane of the sides of the shutter 45, where the sheet 55 is preferably turned down and then inwardly, as at 56 and 57, forming retainers for the shutter 45, extending the length thereof and toward the forward end of the table 7. This sheet may be provided with a suitable opening 58 substantially of the same circumference as the port 8 and aligning therewith. A suitable stop 59 may be provided to limit the rearward sliding movement of the shutter 45.

It will be seen that the axes of the port 46 in the shutter 45 and of the measuring vessels 36 and 37 are the same so that, when the shutter 45 carrying the measuring member 35 is pulled forwardly, these axes may align with the axis of the port 28 of the member 25. Also, it will be seen that when the shutter 45 is pushed rearwardly against the stop 59, the axes of the port 46 in the shutter 45 and of the measuring vessels 36 and 37 will align with the axes of the opening 58 and the port 8.

In the use of the device, a sample quantity of the material to be measured is weighed out or measured in a suitable measuring vessel for bulk. With the member 25 tight against the open end 40 of the measuring vessel 37 and the parts in the position shown in full lines in Figure 1, this sample may be then poured into the hopper 9 and will drop into the measuring member 35. If the sample does not fill up the measuring member 35, one hand of the operator may be employed in holding the member 25 steady while his other hand will first loosen the thumb nuts 19 and then manipulate the measuring member, by rotating the measuring vessel 37 upwardly upon the screw threads 38 and 39, keeping the member 25 in contact with the measuring vessel 37 the while. It is obvious that in the event the sample overflows the top of the measuring member 35, the measuring vessel 37 may be rotated downwardly upon the screw threads 38 and 39 until the correct adjustment is made. When the sample of the material just fills the measuring member 35, the thumb nuts may be tightened with the smooth upper surface 26 of the slideway member 25 in intimate contact with the lower edge of the measuring vessel 37. More material (not measured) may now be placed in the hopper 9. By drawing the shutter 45 forwardly by means of the handle 48, the sample will be carried over the discharge port 28 and discharged into a suitable container underneath the spout 29. The shutter may be slightly oscillated longitudinally in order to shake out all the material contained in the measuring member 35. During this time the port 8 will be closed by the shutter 45 so no material will be lost. As often as the shutter is pushed back against the stop 58 and then drawn forwardly to center the measuring member 35 over the discharge port 28 (as shown in dot and dash lines in Figure 1) using the indicia 30 as a guide, material in the hopper will be measured and delivered in the correct bulk or weight until the hopper is emptied.

Various and very slight adjustments are possible since the slideway 25 may be raised into various planes and held there in cooperation with various degrees of adjustment of the two measuring vessels 36 and 37.

The member 25 provides both a slideway for the measuring means 35 and also a bottom wall therefor, while the metal sheet 55 provides a smooth surface for the top surface of the shutter 45 to slide over and a support therefor, by means of the turned portions 56 and 57.

By drawing the shutter 45 forwardly, it and the measuring member 35 may be drawn wholly from the device for cleaning and since there are no springs nor complicated parts the device is not apt to become clogged with the material being measured nor will it easily get out of order.

Various changes may be made to the form of invention herein shown and described, without departing from the spirit of the invention or the scope of the claims.

What is claimed is:

1. In a bulk material measuring device, a substantially horizontally disposed elongate slideway having a discharge port, a tubular measuring vessel, open at its ends, with one end thereof resting upon said slideway, a second tubular measuring vessel open at its ends and movably interfitted with said first named vessel, means for varying the extent said vessels may interfit and for raising and retaining said first named vessel in various horizontal planes above said slideway, means, independent of said first named means, for moving said slideway into various horizontal planes to form a bottom for said first named vessel, and means for moving said interfitting vessels in a substantially horizontal path over said slideway and for axially aligning said vessels with said discharge port.

2. In a bulk material measuring device, a measuring member open at its ends, a substantially horizontally disposed elongate base member, with said measuring member disposed with an open end thereof upon said base member, said base member having a length and width greater than the length and width of said open end in contact with said base member, said base member having a discharge port, means carried by said measuring member for adjustably varying the height of said measuring member, means for raising said base member into various horizontal planes with its upper surface in contact with said measuring member, and means for sliding one of said members into a substantially horizontal plane with respect to the other and for positioning said discharge port in substantially axial alignment with said measuring member.

3. A bulk material measuring and dispensing device including an elongate substantially horizontally disposed base member and slideway, having a discharge port adjacent one end and a substantially smooth upper surface, means for raising said base member and slideway into various horizontal planes, a horizontally movable shutter spaced above said base member and slideway and provided with a discharge port, a measuring member depending from said shutter about said last named discharge port, said measuring member including a pair of measuring vessels having cooperating screw threads for movably interfitting one vessel with the other, said vessels each having open upper and lower ends with the lower end of the lowermost vessel normally in contact with said smooth surface and slidable thereover, whereby said base member and slideway function as a bottom wall for said measuring member and as a slideway therefor, and means for discharging bulk material into said measuring member thru said second named discharge port.

4. In a bulk material measuring and dispensing device, a vertically adjustable elongate slideway having a discharge opening, a measuring vessel open at its upper and lower ends and disposed upon said slideway, a second measuring vessel, open at its upper and lower ends, said vessels movably interfitting one with the other, means for varying the extent said vessels may interfit, a support having a discharge port, said support being disposed above said slideway and spaced therefrom, bulk material discharging means carried by said support for discharging bulk material thru said last named port and into said measuring vessels, and means for moving said interfitted vessels in a path over said slideway and for axially aligning said vessels with said discharge opening including a shutter carrying said first named measuring vessel and a smooth-surfaced member disposed between said support and said shutter, said member having downwardly and inwardly projecting portions contacting the sides and bottom of said shutter.

HENRY E. HARRIS.